(12) United States Patent
McClellan et al.

(10) Patent No.: US 7,443,410 B2
(45) Date of Patent: *Oct. 28, 2008

(54) RADIALLY NON-COLLINEAR TRACK STARTING POSITIONS ON LABEL SIDE OF OPTICAL DISC

(75) Inventors: Paul J McClellan, Bend, OR (US); David Pettigrew, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 116 days.

This patent is subject to a terminal disclaimer.

(21) Appl. No.: 11/446,618

(22) Filed: Jun. 5, 2006

(65) Prior Publication Data

US 2006/0221777 A1   Oct. 5, 2006

Related U.S. Application Data

(63) Continuation-in-part of application No. 10/317,894, filed on Dec. 12, 2002, now Pat. No. 7,307,649.

(51) Int. Cl.
*B41J 2/47* (2006.01)

(52) U.S. Cl. .................................................. 347/224
(58) Field of Classification Search ......... 347/224–225; 369/30.23, 53.24, 53.29, 53.39; 360/48
See application file for complete search history.

(56) References Cited

U.S. PATENT DOCUMENTS

| 4,584,616 | A  | * | 4/1986  | Allen ........................ 360/48 |
| 6,813,224 | B2 | * | 11/2004 | Stan et al. ................ 369/30.23 |
| 7,084,895 | B2 | * | 8/2006  | McClellan et al. .......... 347/225 |
| 7,268,794 | B2 | * | 9/2007  | Honda et al. ............... 347/224 |

* cited by examiner

*Primary Examiner*—Hai C Pham

(57) ABSTRACT

A method for labeling an optically writable label side of an optical disc of one embodiment of the invention is disclosed which includes at least one of the following. First, the method may multiply pass over a track of the optically writable label side of the optical disc with an optical marking mechanism, such that the optical marking mechanism writes to the track during each pass. Second, the method may advance the optical marking mechanism from the track to a next track of the optically writable label side of the optical disc, such that a starting position on the track is radially non-collinear with a starting position on the next track.

19 Claims, 7 Drawing Sheets

RADIALLY NON-COLLINEAR TRACK STARTING POSITIONS ON LABEL SIDE OF OPTICAL DISC

RELATED APPLICATIONS

This patent application is a continuation-in-part of the previously filed patent application entitled "Optical Disc Non-Cartesian Coordinate System," filed on Dec. 12, 2002 now U.S. Pat No. 7,307,649, and assigned Ser. No. 10/317,894.

BACKGROUND OF THE INVENTION

Computer users employ writable and rewritable optical discs for a variety of different purposes. They may save programs or data to the discs, for archival or distribution purposes. In the case of CD-type discs, users may make music CD's that can be played in audio CD players, or save music data files to the CD's, such as MP3 files, that can be played in special-purpose CD players. In the case of DVD-type discs, users have greater storage capacity available to them than with CD-type discs, and may be able to make video DVD's that can be played in stand-alone DVD players.

Many types of optical discs include a data side and a label side. The data side is where the data is written to, whereas the label side allows the user to label the optical disc. Unfortunately, labeling can be an unprofessional, laborious, and/or expensive process. Markers can be used to write on optical discs, but the results are decidedly unprofessional looking. Special pre-cut labels that can be printed on with inkjet or other types of printers can also be used, but this is a laborious process: the labels must be carefully aligned on the discs, and so on. Special-purpose printers that print directly on the discs may be used, but such printers are fairly expensive. In the patent application entitled "Integrated CD/DVD Recording and Label", filed on Oct. 11, 2001, and assigned Ser. No. 09/976,877, a solution to these difficulties is described, in which a laser is used to label optical discs.

Two concerns in writing to the optically writable label side of an optical disc are image quality and speed. Users typically want the best quality of images possible when optically writing to the label side of an optical disc. However, because mass storage devices that read from and write to optical discs heretofore have been optimized for data storage, and not label marking, their characteristics may affect image quality of images written to the label sides of optical discs. Users also usually want the fastest speed when optically writing to the label side of an optical disc. Again, however, because optical disc mass storage devices have heretofore been optimized for writing to the data sides of optical discs, their characteristics may affect the speed with which the label sides of optical discs can be marked.

SUMMARY OF THE INVENTION

A method for labeling an optically writable label side of an optical disc of one embodiment of the invention includes at least one of the following. First, the method may multiply pass over a track of the optically writable label side of the optical disc with an optical marking mechanism, such that the optical marking mechanism writes to the track during each pass. Second, the method may advance the optical marking mechanism from the track to a next track of the optically writable label side of the optical disc, such that a starting position on the track is radially non-collinear with a starting position on the next track.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
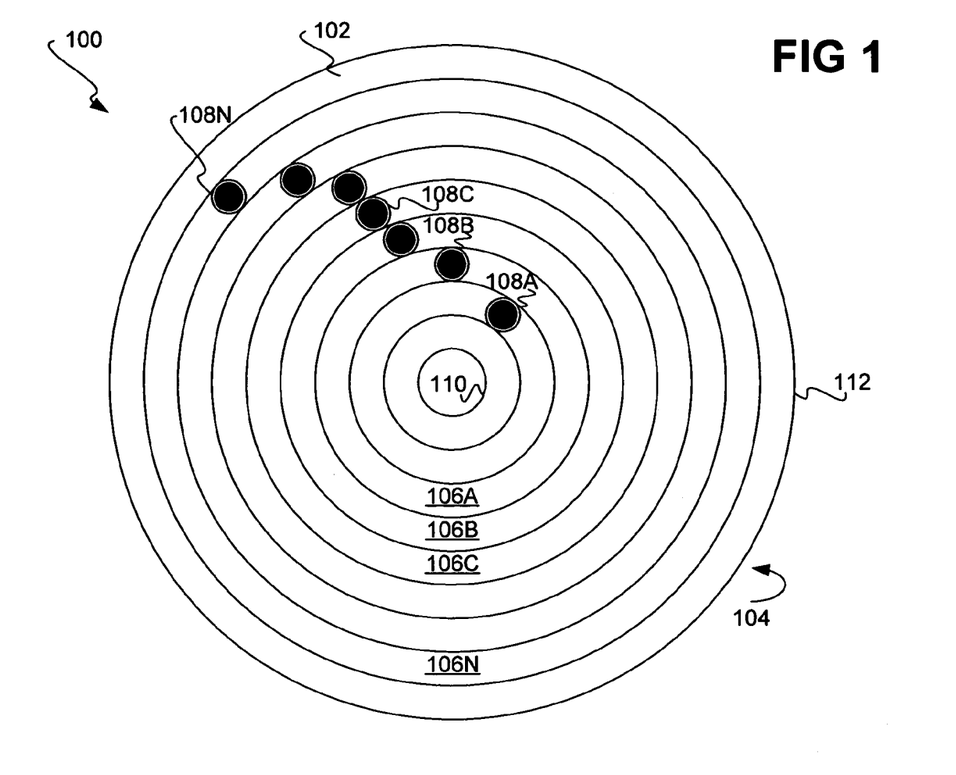
FIG. 1 is a diagram of an optical disc having radially non-collinear track starting positions on the optically writable label side thereof, according to an embodiment of the invention.

Radially Non-collinear Starting Positions on Optically Writable Label Side Tracks FIG. 1 shows an optical disc 100, according to an embodiment of the invention. The optical disc 100 may be a compact disc (CD), a digital versatile disc (DVD), or another type of optical disc. The optical disc 100 has an optically writable label side 102, which is shown in FIG. 1, and an optically writable data side 104 on the opposite side of the optical disc 100. An example of the optically writable label side 102 is particularly disclosed in the patent application entitled "Integrated CD/DVD Recording and Label", filed on Oct. 11, 2001, and assigned Ser. No. 09/976,877.

The optical disc 100 has an inside edge 110 and an outside edge 112. The optical disc 100 also has a number of concentric circular tracks 106A, 106B, 106C, . . . , 106N, collectively referred to as the tracks 106. An optical marking mechanism, such as a laser, may write marks to pixels of the tracks 106. There may be 700, 800, or more or less of the tracks 106. The tracks 106A, 106B, 106C, . . . , 106N have starting positions 108A, 108B, 108C, . . . , 108N, respectively, the latter which are collectively referred as the starting positions 108. The starting positions 108 are the first pixels on the tracks 106 to which the optical marking mechanism may write marks when advancing to the tracks 106. For instance, when the optical marking mechanism advances to the track 106A, it starts at the starting position 108A, such that the mechanism is able to first write a mark on the track 106A to the pixel of the starting position 108A.

The starting positions 108 are radially non-collinear to one another. This means that all the starting positions 108 do not line up on any radial line from the inside edge 110 to the outside edge 112 of the optical disc 100. Any two or more of the starting positions 108 may be collinear to a radial line from the inside edge 110 to the outside edge 112 in one embodiment, but not all the starting positions 108 are collinear to such a radial line. The actual starting positions 108 may be determined in one embodiment at least in a random manner, where the starting positions 108 are at least randomly determined relative to one another. Other reasons and bases by which the starting positions 108 are determined are now described.

Figure 2:
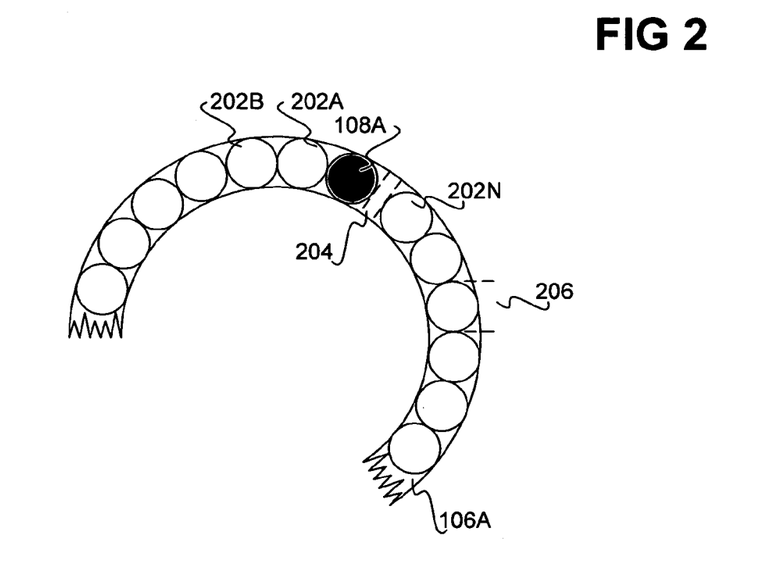
FIG. 2 is a diagram of an optically writable label side track of an optical disc to show how having radially non-collinear track starting positions on the label side reduces discernment of end-of-track unmarked pixels, according to an embodiment of the invention.

FIG. 2 depicts the track 106A in detail, according to an embodiment of the invention, to show how the starting positions 108 are radially non-collinear at least to reduce discernment of end-of-track unmarked pixel effects on the tracks 106. Such end-of-track unmarked pixel effects can result from the lengths of the tracks 106 varying from integral multiples of a mark length with which the optical marking mechanism is able to write to the tracks 106. For instance, the optical marking mechanism can write marks to the track 106A in FIG. 2 starting at the pixel of the starting position 108A, and continuing to the pixels 202A, 202B, . . . , 202N around the track 106A, where the pixel 202N is the last position on the track 106A at which the mechanism can write a mark. Each of the pixels 202, and the pixel of the starting position 108A, can have a greatest diameter, or marking length, 206. The sizes of the pixels 202 are greatly exaggerated for illustrative clarity, as can be appreciated by those of ordinary skill within the art. Furthermore, the marks written on the pixels 202 can be shapes other than circular, such as rectangular, elliptical, and so on.

Where the length around the track 106A is not an integral multiple of the diameter 206, this means that a gap 204 remains on the track 106A between the last pixel 202N and the starting position 108A, to which the optical marking mechanism may not be able to write a mark. The length of the gap 204 is less than the diameter 206. If all the starting positions 108 were radially collinear, then a narrow line corresponding to the gap 204 of each of the tracks 106 may be easily discerned where most of the starting positions 108 and the last positions on the tracks 106 have marks written to their pixels. By adjusting the starting positions 108 so that they are non-collinear, embodiments of the invention reduce the discernment of such lines.

Figure 3:
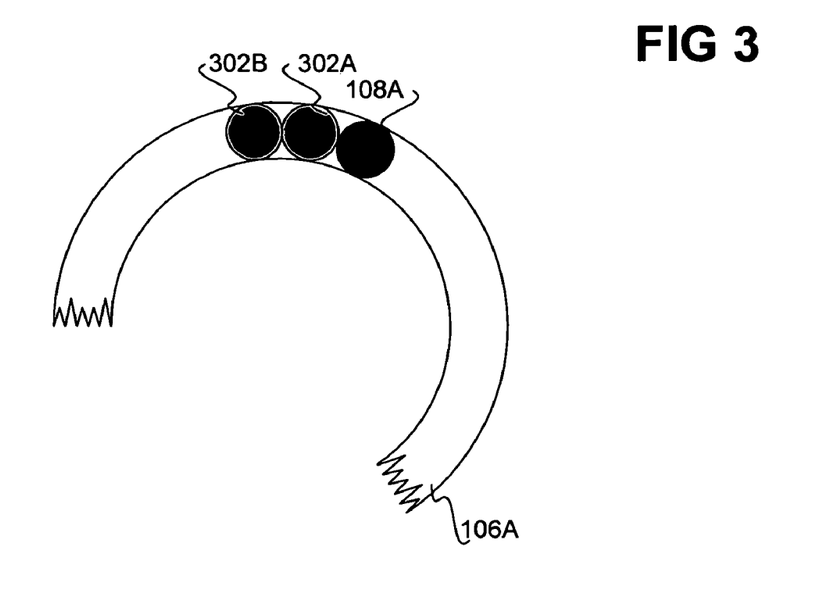
FIG. 3 is a diagram of an optically writable label side track of an optical disc to show how having radially non-collinear track starting positions on the label side reduces discernment of starting position pixel marking effects, according to an embodiment of the invention.

FIG. 3 depicts the track 106A in detail, according to another embodiment of the invention, to show how the starting positions 108 are radially non-collinear at least to reduce discernment of starting position pixel marking effects on the tracks 106. Such starting position pixel marking effects can result from the optical marking mechanism writing marks to the pixels of the starting positions 108 differently than when it writes to the other pixels of the tracks 106. This may be because a laser or other part of the optical marking mechanism has not completely stabilized, such that it writes a too dark or a too light pixel to the pixels of the starting positions 108.

For instance, as shown in FIG. 3, the optical marking mechanism writes more darkly to the pixel of the starting position 108A of the track 106A than it does to the pixels 302A and 302B. If all the starting positions 108 were radially collinear, then a narrow dark line corresponding to the pixels of the starting positions 108 may be easily discerned where most of the starting positions 108 have marks written to their pixels. By adjusting the starting positions so that they are non-collinear, embodiments of the invention reduce the discernment of such lines.

Figure 4:
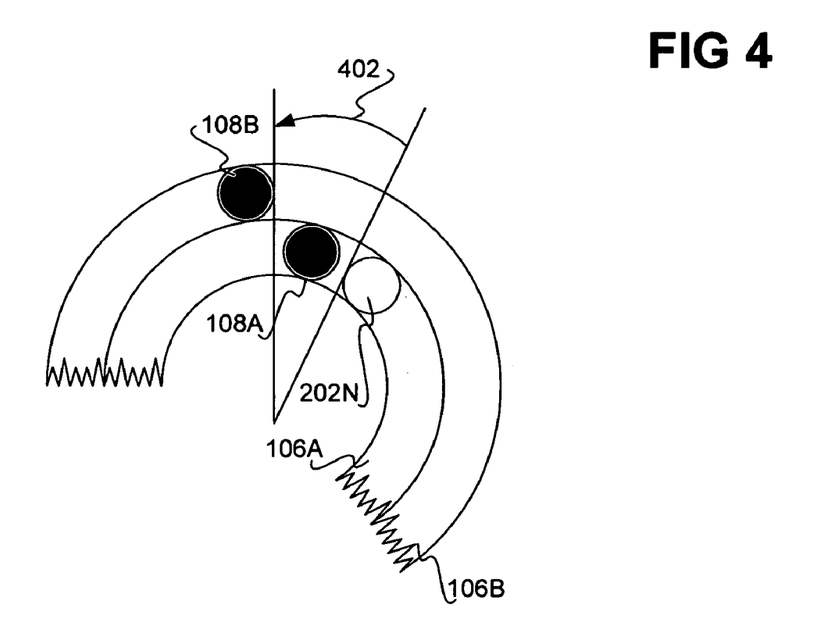
FIG. 4 is a diagram of two optically writable label side tracks of an optical disc to show how having radially non-collinear track starting positions on the label side may be based on the length of time needed to reposition and stabilizing an optical marking mechanism when advancing between tracks, according to an embodiment of the invention.

FIG. 4 depicts the tracks 106A and 106B in detail, according to an embodiment of the invention, to show how the starting positions 108 are radially non-collinear at least based on an angular distance corresponding to a length of time needed to reposition and stabilize the optical marking mechanism when advancing between the tracks 106A and 106B. For instance, the optical disc 100 of which the tracks 106A and 106B are a part may be constantly rotating. Once the optical marking mechanism has written or advanced to the last pixel 202N of the track 106A and is ready to advance to the track 106B, the disc 100 continues to rotate while the marking mechanism advances to the track 106B and is stabilized so that it can begin writing to the pixel of the starting position 108B of the track 106B. The optical disc 100 may have rotated by the angular distance 402 during the length of time it took for the optical marking mechanism to so reposition and stabilize.

If the starting positions 108A and 108B were collinear, then by the time the optical marking mechanism was ready to begin writing to the track 106B, the optical disc 100 already would have rotated such that the mechanism was past the starting position 108B on the track 106B. This means that the optical marking mechanism would have to wait until the optical disc 100 rotated completely around such that the mechanism was again positioned at the starting position 108B on the track 106B. This waiting period delays the speed at which the optical marking mechanism is able to completely write images to the label side 102 of the optical disc 100.

Embodiments of the invention space the starting positions 108 apart based on the angular distance 402 corresponding to the length of time it takes for the optical marking mechanism to reposition and stabilize. In so doing, embodiments of the invention avoid the mechanism having to wait for the optical disc 100 to completely rotate so that the mechanism is at the next of the starting positions 108 when advancing to a next track. This increases the speed at which the optical marking mechanism is able to completely write images to the label side of the optical disc 100.

Multiple Passes Over Optically Writable Label Side Tracks

Figure 5:
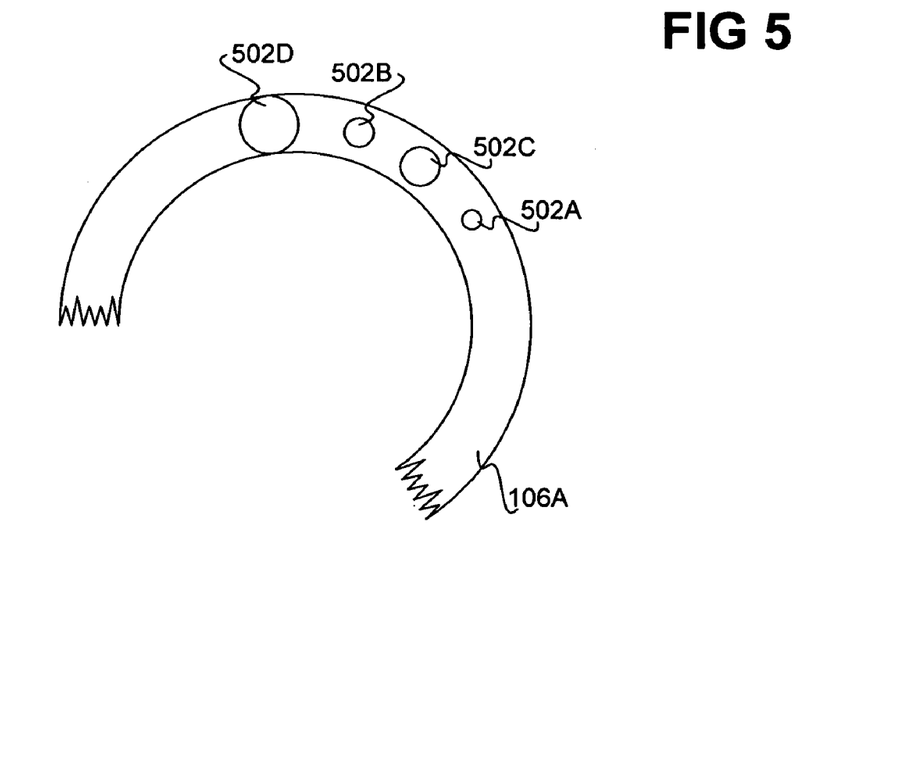
FIG. 5 is a diagram of an optically writable label side track of an optical disc to show how multiple passes over the track by an optical marking mechanism can result in differently sized pixels where the marking intensity of the mechanism changes between passes, according to an embodiment of the invention.

FIG. 5 depicts the track 106A of the optical disc 100 in detail, according to an embodiment of the invention, to show how the optical marking mechanism is able to write marks to pixels of different sizes during multiple passes by adjusting, or varying, the marking intensity between passes. For example, the optical marking mechanism may pass over the track 106A four times. In each pass, the marking intensity at which the mechanism writes marks to the pixels of the track 106A increases, or alternatively decreases.

Thus, in a first pass, the marking mechanism may write a mark to the pixel 502A, and in a second pass, the mechanism may write a mark to the pixel 502B. Where the marking intensity of the optical marking mechanism is greater in the second pass than in the first pass, this results in the pixel 502B being larger and/or darker than the pixel 502A. Similarly, in a third pass, the mechanism may write a mark to the pixel 502C, and in a fourth pass, may write a mark to the pixel 502D. Where the marking intensity of the marking mechanism is greater in the third pass than in the second pass, and is greater in the fourth pass than in the third pass, this results in the pixel 502C being larger and/or darker than the pixel 502B, and in the pixel 502D being larger and/or darker than the pixel 502C. The pixels 502A, 502B, 502C, and 502D thus may have different sizes and/or optical densities, or intensities. In this way, the optical marking mechanism is able to render multiple levels of pixel grayscale when writing to the pixels of the tracks 106 of the optical disc 100.

The mechanism may not be able to change or modulate its marking intensity on a pixel-by-pixel basis, such that having the mechanism pass over each of the tracks 106 more than one time allows the mechanism instead to change or modulate its marking intensity on a track pass-by-track pass basis. Furthermore, preferably the pixels 502A, 502B, 502C and 502D are mutually exclusive of one another. That is, in one embodiment the marking mechanism does not write a mark to the same pixel more than once over the multiple passes over the pixel.

Figure 6:
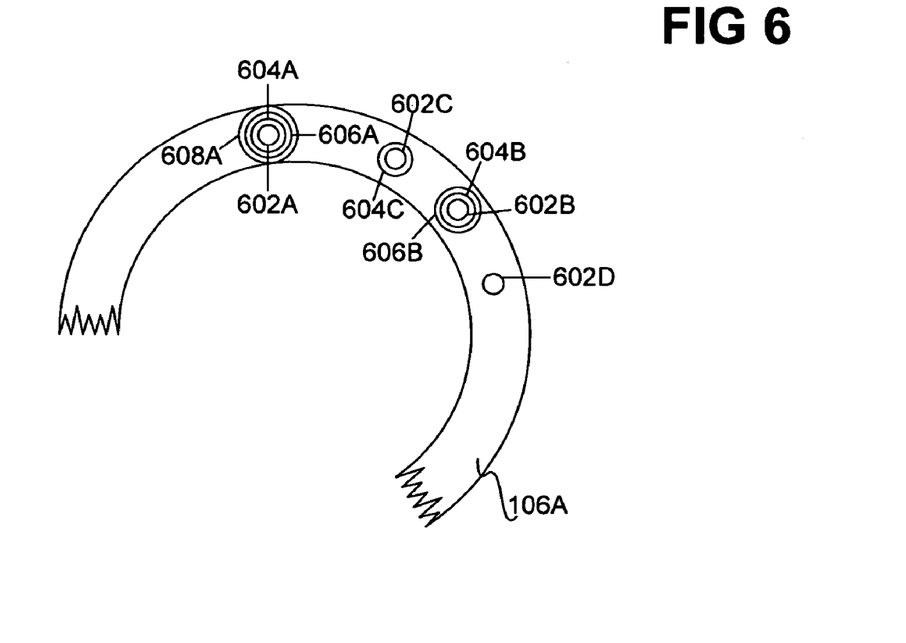
FIG. 6 is a diagram of an optically writable label side track of an optical disc to show how multiple passes over the track by an optical marking mechanism can result in differently sized pixels where the marking intensity of the mechanism remains constant between passes, according to an embodiment of the invention.

FIG. 6 depicts the track 106A of the optical disc 100 in detail, according to another embodiment of the invention, to show how the optical marking mechanism is able to write marks to pixels of different sizes during multiple passes by maintaining a constant marking intensity between passes. For example, the optical marking mechanism may pass over the track 106A four times. In each pass, the marking intensity at which the mechanism writes marks to the pixels of the track 106A remains the same, although the marking mechanism may write to the same pixel more than once over the multiple passes to increase its density and/or size.

Thus, in a first pass the optical marking mechanism may write marks to the pixels 602A, 602B, 602C, and 602D, in a second pass the marking mechanism may write marks to the pixels 604A, 604B, and 604C, in a third pass the mechanism may write marks to the pixels 606A and 606B, and in a fourth pass it may write a mark to the pixel 608A. The pixels 602A, 604A, 606A, and 608A are coincident or concentric with one another. That is, the pixels 602A, 604A, 606A, and 608A are on the same position on the track 106A. Similarly, the pixels 602B, 604B, and 606B are coincident or concentric with one another, and the pixels 602C and 604C are coincident or concentric with one another. The number of times that the marking mechanism writes marks to pixels that are coincident or concentric with one another over the multiple passes controls how large or dark the resulting pixels at these positions on the track 106A will be.

Therefore, the pixel 608A is ultimately darker and/or larger than the pixel 606B, which is ultimately darker and/or larger than the pixel 604C, which is ultimately darker and/or larger than the pixel 602D. This is because the marking mechanism writes to the same position of the pixel 608A four times. During the first pass, the mechanism writes to the pixel 602A, during the second pass it writes to the pixel 604A, during the third pass it writes to the pixel 606A, and during the fourth pass it finally writes to the pixel 608A, where pixels 602A, 604A, 606A, and 608A are coincident or concentric with one another. Each time the optical marking mechanism writes marks to pixels on the same position, the mechanism darkens and/or enlarges the resulting pixel. Thus, the pixel 608A is darker and/or larger than the pixel 606B, 604C, and 602D, because the marking mechanism has written to the position of the pixel 608A four times, whereas it has written to the position of the pixel 606B three times, to the position of the pixel 604C twice, and to the position of the pixel 602D once.

The optical marking mechanism may not be able to operate at a high, constant duty cycle, or at a maximum, constant marking intensity, for an entire pass of one of the tracks 106. Therefore, the embodiment of the invention described in conjunction with FIG. 5 may not be suitable. By comparison, the embodiment of the invention described in conjunction with FIG. 6 may allow the optical marking mechanism to operate at a lower, constant duty cycle, or at a lower, constant marking intensity, for the entire pass of one of the tracks 106, while still being able to achieve pixels having different sizes and/or different optical densities, or intensities. Thus, the mechanism is still able to render multiple levels of pixel grayscale when writing to the pixels of the tracks 106. Unlike the embodiment of FIG. 5, however, the marking mechanism writes marks to the same pixel more than once during the multiple passes over the pixel to achieve greater pixel size and/or optical density, or intensity. That is, in the embodiment of FIG. 6, during each successive pass over the same track the marking mechanism writes to a subset of the pixels that were written to in the previous pass. Furthermore, in another embodiment of the invention, the marking process may be dispersed over all of the passes to reduce the duty cycle of the marking mechanism.

Figure 7:
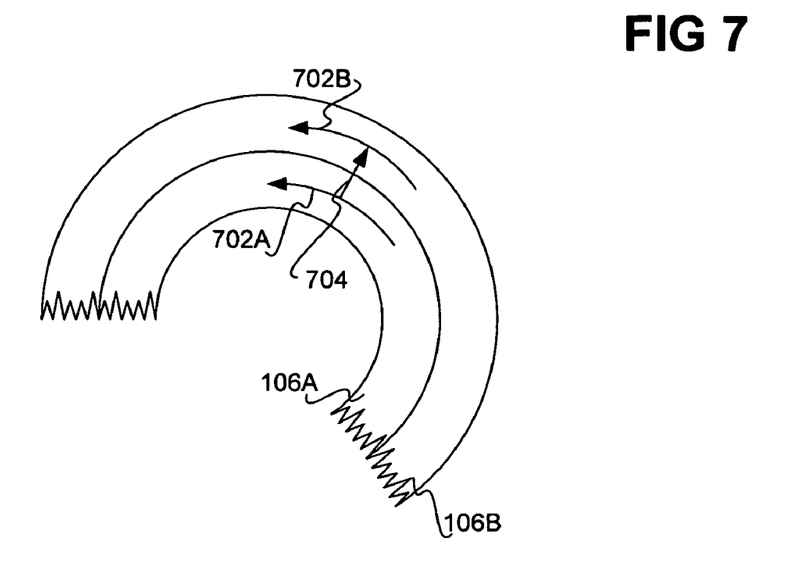
FIG. 7 is a diagram of two optically writable label side tracks of an optical disc to show how an optical marking mechanism repeatedly passes over one track and advances to the next, physically contiguous track when a track-advance signal is received, according to an embodiment of the invention.

In one embodiment, the optical marking mechanism passes over each of the tracks 106 a predetermined number of times before the marking mechanism automatically advances to the next, physically contiguous track. In another embodiment, however, the optical marking mechanism repeatedly passes over each of the tracks 106 until a track-advance signal has been received. FIG. 7 depicts the advancement of the optical marking mechanism from the track 106A to the track 106B according to this embodiment of the invention. The marking mechanism initially passes one or more times over the track 106A, as indicated by the arrow 702A. As can be appreciated by those of ordinary skill within the art, the disc 102 may be rotated in a clockwise direction opposite to that indicated by the arrow 702A, instead of in the counter-clockwise direction indicated by the arrow 702A. The marking mechanism does not advance to the track 106B until a track-advance signal has been received. Once the track-advance signal has been received, then the mechanism advances to the track 106B, as indicated by the arrow 704. The optical marking mechanism continues to pass over the track 106B, as indicated by the arrow 702B, until another track-advance signal has been received.

Thus, in this embodiment, the optical marking mechanism passes over each of the tracks 106 at least once, but may pass over each of the tracks 106 a different number of times, depending on, for example, the number of passes needed for the optical marking mechanism to write marks to pixels of different sizes and/or different optical densities on a given of the tracks 106. For example, the track 106A may not need to have any of its pixels to be written to with maximum size or darkness, whereas the track 106B may have to have some of its pixels written to with maximum size or darkness. As a result, the optical marking mechanism may pass over the track 106A one or more fewer times than it passes over the track 106B, such that the track-advance signal is received one or more passes sooner when the mechanism is over the track 106A as compared to when it is over the track 106B. This means that ultimately the speed at which the optical marking mechanism is able to completely write images to the label side of the optical disc 100 is increased as compared to if the mechanism were to have to pass over each of the tracks 106 the same number of times.

In the embodiment of the invention that has just been described, the track-advance signal causes the optical marking mechanism to advance from the current of the tracks 106 to the next, physically adjacent of the tracks 106. However, not all of the tracks 106 may have to have marks written to their pixels by the optical marking mechanism. As a result, the optical marking mechanism may have to pass around each of the tracks 106 at least once, regardless of whether a given track has to have marks written to its pixels. In another embodiment, however, the optical marking mechanism is able to receive a track-advance signal that indicates the number of tracks by which to advance from the current track. Thus, if a given of the tracks 106 does not have to have marks written to any of its pixels, then the optical marking mechanism is able to completely skip this track without having to pass around the track even once.

Figure 8:
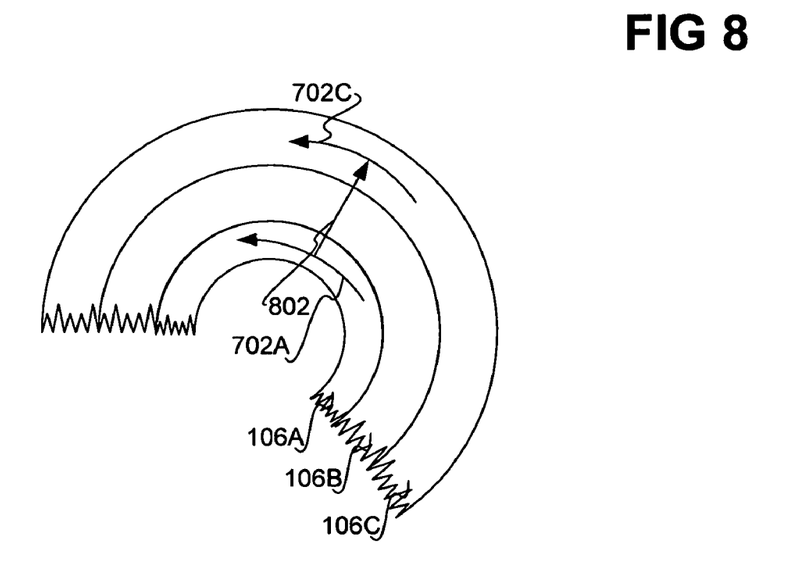
FIG. 8 is a diagram of three optically writable label side tracks of an optical disc to show how an optical marking mechanism repeatedly passes over one track and can advance to a next track that is not physically contiguous to it when a track-advance signal is received that specifies the number of tracks to skip, according to an embodiment of the invention.

FIG. 8 depicts the advancement of the optical marking mechanism from the track 106A to the track 106C, past the track 106B, according to this embodiment of the invention. The marking mechanism initially passes one or more times over the track 106A, as indicated by the arrow 702A, as before. The next track to be written to in the example of FIG. 8 is not the physically adjacent track 106B, but rather the track 106C. Therefore, after the optical marking mechanism has passed over the track 106A the appropriate number of times, a track-advance signal is received that indicates that the marking mechanism is to advance by two tracks, from the track 106A to the track 106C, such that the track 106B is completely skipped.

Once such a track-advance signal has thus been received, then the optical marking mechanism advances to the track 106C, as indicated by the arrow 802. The optical marking mechanism continues to pass over the track 106C, as indicated by the arrow 702C, until another track-advance signal has been received. The embodiment of FIG. 8 thus may further enhance the speed at which the optical marking mechanism is able to completely write images to the label side of the optical disc 100, as compared to the embodiment of FIG. 7. This is the case where the embodiment of FIG. 7 causes the optical marking mechanism to pass over each of the tracks 106 at least once, and especially where the image to be written to the label side of the optical disc 100 does not need all of the tracks 106 to have marks written thereto by the marking mechanism.

Mass Storage Device and Methods

Figure 9:
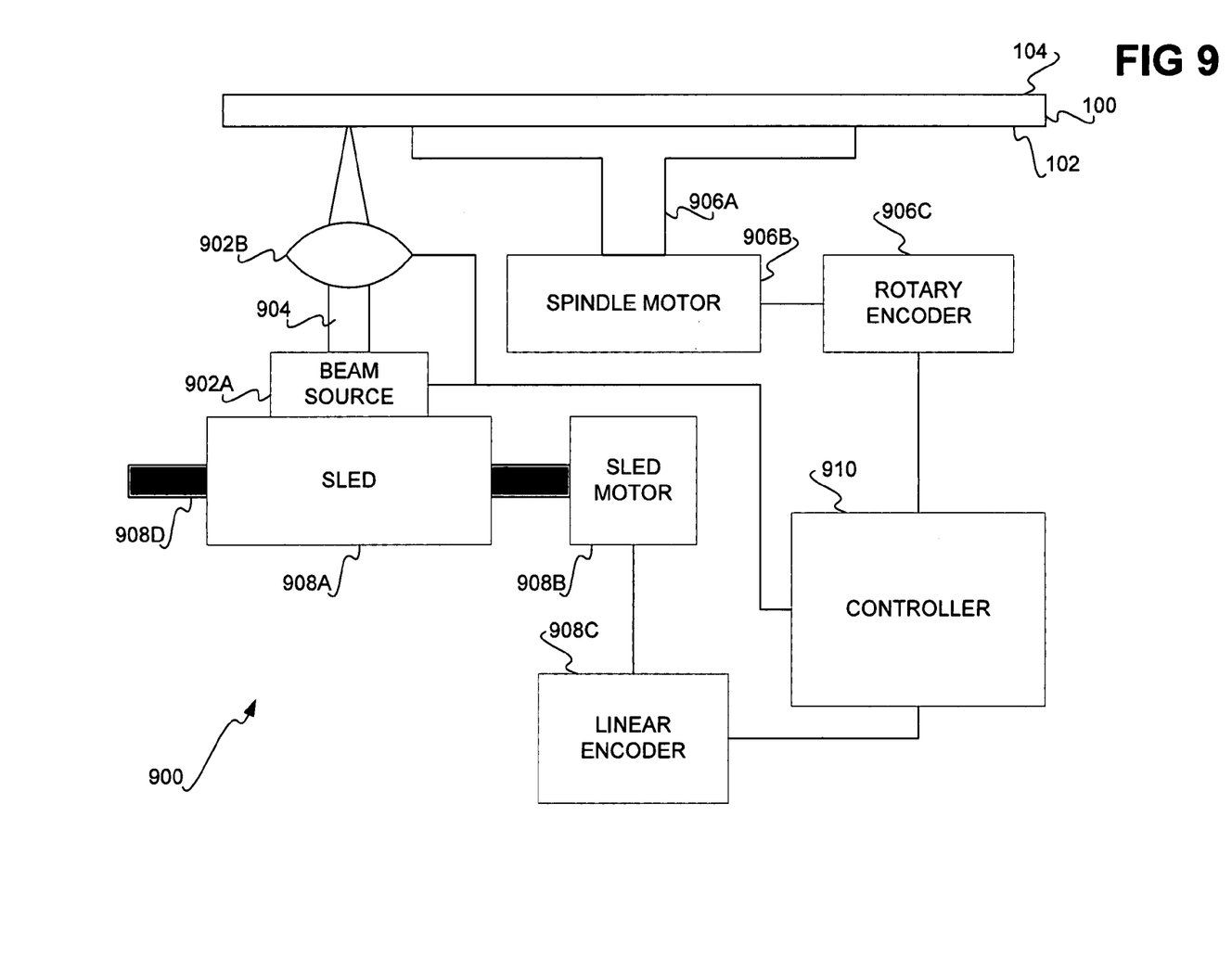
FIG. 9 is a diagram of a mass storage device, according to an embodiment of the invention.

FIG. 9 shows a mass storage device 900, according to an embodiment of the invention. The mass storage device 900 is for reading from and/or writing to the optical disc 100. More specifically, the mass storage device 900 is for reading from and/or writing to an optically writable data surface of the optical disc 100, and/or an optically writable label surface of the optical disc 100. The mass storage device 900 includes a beam source 902A and an objective lens 902B, which are collectively referred to as the optical marking mechanism 902. The storage device 900 also includes a spindle 906A, a spindle motor 906B, and a rotary encoder 906C, which are collectively referred to as the first motor mechanism 906. The device 900 includes a sled 908A, a sled motor 908B, a linear encoder 908C, and a rail 908D, which are collectively referred to as the second motor mechanism 908. Finally, the mass storage device 900 includes a controller 910.

The optical marking mechanism 902 focuses an optical beam 904 on the optical disc 100, for at least marking the label side 102 of the optical disc 100, and which also may be used to read from the label side 102 of the disc 100, as well as read from and/or write to the data side 104 of the disc 100. Specifically, the beam source 902A generates the optical beam 904, which is focused through the objective lens 902B onto the optical disc 100, such as in a manner known to those of ordinary skill within the art. The first motor mechanism 906 rotates the optical disc 100. Specifically, the optical disc 100 is situated on the spindle 906A, which is rotated, or moved, by the spindle motor 906B to a given position specified by the rotary encoder 906C communicatively coupled to the spindle motor 906B. The rotary encoder 906C may include hardware, software, or a combination of hardware and software. The second motor mechanism 908 moves the optical marking mechanism 902 radially relative to the optical disc 100. Specifically, the optical marking mechanism 902 is situated on the sled 908A, which is moved on the rail 908D by the sled motor 908B to a given position specified by the linear encoder 908C communicatively coupled to the sled motor 908B. The linear encoder 908C may include hardware, software, or a combination of hardware and software.

The controller 910 advances the optical marking mechanism 902 to radially non-collinear starting positions 108 on the tracks 106 of the optically writable label side 102 of the optical disc 100, and causes the mechanism 902 to multiply pass over the tracks, by controlling the first and the second motor mechanisms 906 and 908, until the controller receives track-advance signals. This may be accomplished as has been described in the preceding section of the detailed description. The controller 910 may maintain a constant marking intensity of the optical marking mechanism 902 during each pass over a track, or may vary the marking intensity of the mechanism 902 during each pass.

The controller 910 advances the optical marking mechanism 910 from one track to another track by controlling the first and the second motor mechanisms 906 and 908, upon receiving a track-advance signal. In one embodiment, the controller 910 advances the mechanism 908 from a current track by a number of tracks corresponding to the track-advance signal that it has received, by controlling the motor mechanisms 906 and 908. The controller 910 may also be that which determines the radially non-collinear starting positions 108 on the tracks 106, as has been described in the preceding section of the detailed description.

As can be appreciated by those of ordinary skill within the art, the components depicted in the mass storage device 900 are representative of one embodiment of the invention, and do not limit all embodiments of the invention. Other control approaches can also be employed. As only one example, the sled 908A may be positioned with the sled motor 908B, with finer adjustment obtained using a voice coil attached to the beam source 902A and/or the objective lens 902B.

Figure 10:
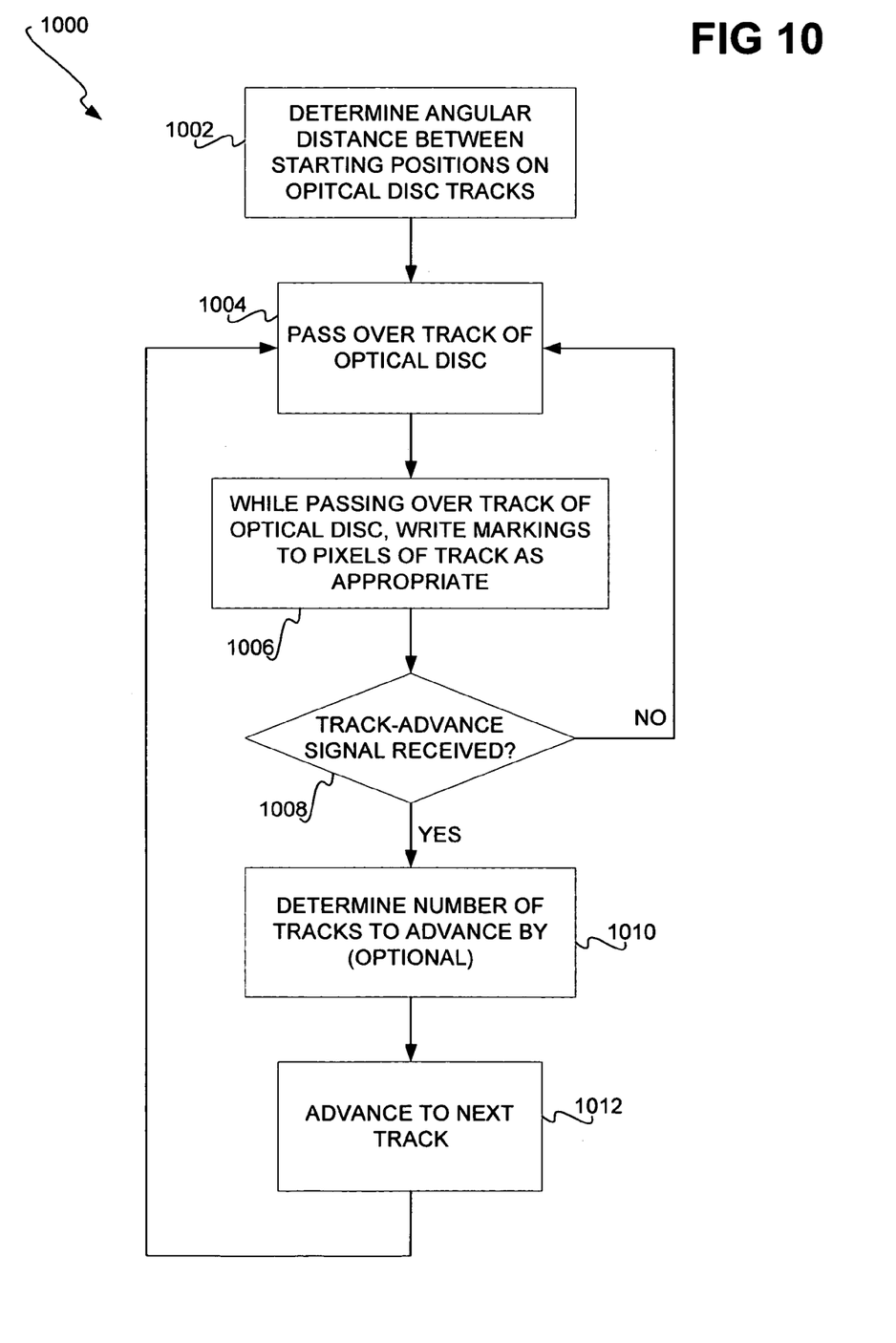
FIG. 10 is a flowchart of a method for optically labeling the optically writable label side of an optical disc with an image, according to an embodiment of the invention.

FIG. 10 shows a method 1000 for optically writing an image on the optically writable label side 102 of the optical disc 100, according to an embodiment of the invention. The mass storage device 900 of FIG. 9 may perform the method 1000 in one embodiment of the invention. For instance, the controller 910 may perform the method 1000. First, the angular distance(s) between the starting positions 108 on the tracks 106 of the optical disc 100 are determined (1002). Such determination may be to reduce discernment of end-of-track unmarked pixels, and/or to reduce discernment of starting position pixel marking effects, as has been described. Such determination may also be accomplished at least partially randomly, and/or may be based on the length of time needed to reposition the optical marking mechanism 902 when advancing between tracks.

Next, the optical marking mechanism 902 passes over one of the tracks 106 of the optical disc 100 (1004). While the mechanism 902 is passing over this track, it writes markings to pixels of the track as appropriate (1006), in accordance with the image to be optically written on the optically writable label side 102 of which the tracks 106 are a part. If a track-advance signal has not been received (1008), then the method 1000 repeats 1004 and 1006. In one embodiment, the marking intensity, or power, of the optical marking mechanism 902 remains constant between passes over the track, whereas in another embodiment, it varies between passes over the track. That is, the optical marking mechanism 902 writes markings to pixels of the track during passes over the track as has been described in the preceding section of the detailed description.

Once the track-advance signal has been received (1008), the track-advance signal may be of one of two types. First, the track-advance signal may specify that the controller 910 cause the optical marking mechanism 902 to advance to the next, immediately physically adjacent track, in which cause 1010 is not performed. Second, the track-advance signal may specify the number of tracks from the current track that the controller 910 should advance the optical marking mechanism 902. In this case, the controller 910 preferably determines the number of tracks to advance the mechanism 902 by, from the track-advance signal (1010). Ultimately, the optical marking mechanism 902 advances to the next track (1012), whether this next track is physically contiguous to the current track or not. The method 1000 then repeats starting at 1004 as has been described.

Figure 11:
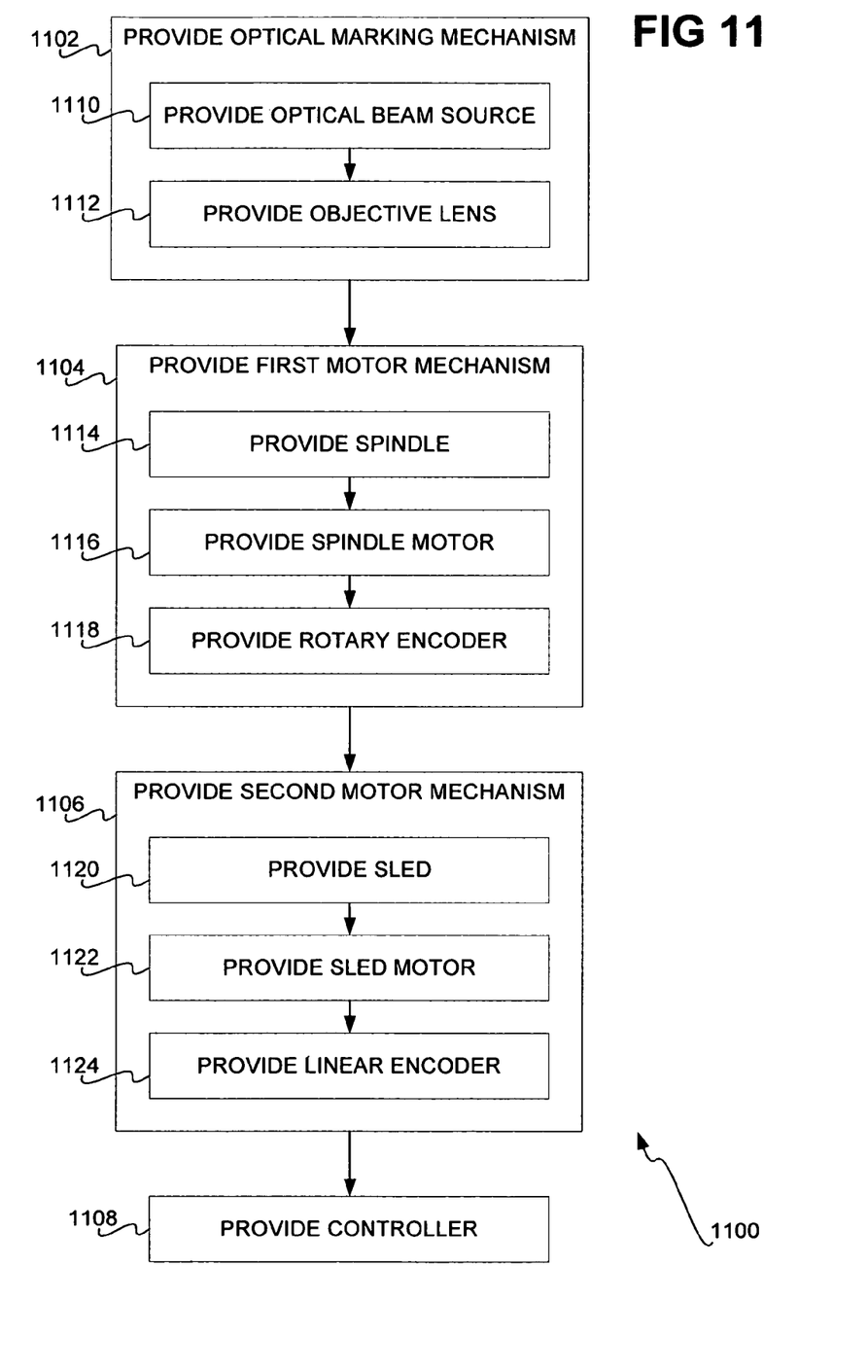
FIG. 11 is a flowchart of a method for manufacturing the mass storage device of FIG. 9, according to an embodiment of the invention.

FIG. 11 shows a method of manufacture 1100 for the mass storage device 900 of FIG. 9, according to an embodiment of the invention. The method 1100 includes providing the optical marking mechanism 902 (1102), providing the first motor mechanism 906 (1104), providing the second motor mechanism 908 (1106), and providing the controller 910 (1108). In one embodiment, providing the optical marking mechanism 902 includes providing the optical beam source 902A (1110) and the objective lens 902B (1112), whereas providing the first motor mechanism 906 in one embodiment includes providing the spindle 906A (1114), the spindle motor 906B (1116), and the rotary encoder 906C (1118). Finally, providing the second motor mechanism 908 in one embodiment includes providing the sled 908A (1120), the sled motor 908B (1122), and the linear encoder 908C (1124).

CONCLUSION

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of the disclosed embodiments of the present invention. Therefore, it is manifestly intended that this invention be limited only by the claims and equivalents thereof.

We claim:

1. A method for labeling an optically writable label side of an optical disc comprising:

advancing an optical marking mechanism from a track of the optically writable label side of optical disc to another track of the optically writable label side of the optical disc, such that a starting position on the track is radially non-collinear with a starting position on the other track; and, determining an angular distance between the starting position on the track and the starting position on the other track at least to reduce discernment of end-of-track unmarked pixel effects on the track and the other track resulting from lengths of the track and the other track varying from integral multiples of a mark length with which the optical marking mechanism writes to the track and the other track.

2. The method of claim 1, wherein the other track is one of:

a next track adjacent to the track; and, a next track not adjacent to the track.

3. The method of claim 1, further comprising receiving a track-advance signal.

4. The method of claim 3, further comprising, upon receiving the track-advance signal, advancing the optical marking mechanism from the track to the other track of the optically writable label side of the optical disc.

5. The method of claim 4, further comprising, determining a number of tracks specified by the track-advance signal, such that advancing the optical marking mechanism from the track to the other track of the optically writable label side of the optical disc comprises advancing the optical marking mechanism from the track by the number of tracks specified by the track advance signal to the other track.

6. The method of claim 1, further comprising advancing the optical marking mechanism from the other track to a third track of the optically writable label side of the optical disc, such that the starting position on the other track is radially non-collinear with a starting position on the third track.

7. The method of claim 1, wherein determining the angular distance between the starting position on the track and the starting position on the other track is further at least to reduce discernment of starting position pixel marking effects of the optical marking mechanism at the starting positions on the track and the other track.

8. The method of claim 1, wherein determining the angular distance between the starting position on the track and the starting position on the other track is performed based on at least a length of time needed to reposition and stabilize the optical marking mechanism when advancing from the track to the other track.

9. The method of claim 1, wherein determining the angular distance between the starting position on the track and the starting position on the other track is performed at least partially randomly.

10. A mass storage device comprising:
- an optical marking mechanism to at least optically write markings on a plurality of tracks of an optically writable label side of an optical disc;
- a first motor mechanism to rotate the optical disc;
- a second motor mechanism to move the optical marking mechanism radially relative to the optical disc; and,
- a controller to advance the optical marking mechanism to a starting position on a track of the plurality of tracks radially non-collinear with starting positions on other tracks of the plurality of tracks,
- wherein the controller determines the radially non-collinear starting positions on the plurality of tracks at least to reduce discernment of end-of-track unmarked pixel effects on the plurality of tracks and discernment of starting position pixel marking effects of the optical marking mechanism at the starting positions on the plurality of tracks.

11. The mass storage device of claim 10, wherein the controller determines the radially non-collinear starting positions on the plurality of tracks based on at least a length of time needed to reposition and stabilize the optical marking mechanism when advancing between two of the plurality of tracks.

12. A method for labeling an optically writable label side of an optical disc comprising:
- advancing an optical marking mechanism from a track of the optically writable label side of optical disc to another track of the optically writable label side of the optical disc, such that a starting position on the track is radially non-collinear with a starting position on the other track; and,
- determining an angular distance between the starting position on the track and the starting position on the other track at least to reduce discernment of starting position pixel marking effects of the optical marking mechanism at the starting positions on the track and the other track.

13. The method of claim 12 wherein the other track is one of
- a next track adjacent to the track; and,
- a next track not adjacent to the track.

14. The method of claim 12, further comprising receiving a track-advance signal.

15. The method of claim 14, further comprising, upon receiving the track-advance signal, advancing the optical marking mechanism from the track to the other track of the optically writable label side of the optical disc.

16. The method of claim 15, further comprising, determining a number of tracks specified by the track-advance signal, such that advancing the optical marking mechanism from the track to the other track of the optically writable label side of the optical disc comprises advancing the optical marking mechanism from the track by the number of tracks specified by the track advance signal to the other track.

17. The method of claim 12, further comprising advancing the optical marking mechanism from the other track to a third track of the optically writable label side of the optical disc, such that the starting position on the other track is radially non-collinear with a starting position on the third track.

18. The method of claim 12, wherein determining the angular distance between the starting position on the track and the starting position on the other track is performed based on at least a length of time needed to reposition and stabilize the optical marking mechanism when advancing from the track to the other track.

19. The method of claim 12, wherein determining the angular distance between the starting position on the track and the starting position on the other track is performed at least partially randomly.

* * * * *

UNITED STATES PATENT AND TRADEMARK OFFICE
CERTIFICATE OF CORRECTION

PATENT NO. : 7,443,410 B2
APPLICATION NO. : 11/446618
DATED : October 28, 2008
INVENTOR(S) : Paul J McClellan et al.

It is certified that error appears in the above-identified patent and that said Letters Patent is hereby corrected as shown below:

In column 12, line 5, in Claim 13, delete "of" and insert -- of: --, therefor.

Signed and Sealed this

Eighteenth Day of August, 2009

David J. Kappos
*Director of the United States Patent and Trademark Office*